(12) United States Patent
Barrabino

(10) Patent No.: US 10,081,128 B2
(45) Date of Patent: Sep. 25, 2018

(54) METHOD FOR FORMING A SEALING ELEMENT FROM EXTRUDED THERMOPLASTIC RODS

(71) Applicant: SINGLE BUOY MOORINGS INC., Marly (CH)

(72) Inventor: Eric Barrabino, Monaco (MC)

(73) Assignee: SINGLE BUOY MOORINGS INC., Marly (CH)

( * ) Notice: Subject to any disclaimer, the term of this patent is extended or adjusted under 35 U.S.C. 154(b) by 222 days.

(21) Appl. No.: 15/117,355

(22) PCT Filed: Feb. 6, 2015

(86) PCT No.: PCT/EP2015/052509
§ 371 (c)(1),
(2) Date: Aug. 8, 2016

(87) PCT Pub. No.: WO2015/118104
PCT Pub. Date: Aug. 13, 2015

(65) Prior Publication Data
US 2016/0346990 A1  Dec. 1, 2016

(30) Foreign Application Priority Data
Feb. 7, 2014  (EP) .................................... 14154346

(51) Int. Cl.
*B32B 37/00* (2006.01)
*B29C 53/08* (2006.01)
(Continued)

(52) U.S. Cl.
CPC ............ *B29C 53/083* (2013.01); *B29B 13/10* (2013.01); *B29C 53/36* (2013.01); *B29C 65/02* (2013.01);
(Continued)

(58) Field of Classification Search
CPC ....... B29C 53/083; B29C 53/36; B29C 65/02; B29C 65/1412; B29C 66/1142;
(Continued)

(56) References Cited

U.S. PATENT DOCUMENTS 8,721,823 B2 * 5/2014 Vaideeswaran ....... B29C 53/083
156/217
2004/0232624 A1  11/2004 Hisano et al.
2010/0116422 A1  5/2010 Vaideeswaran et al.

FOREIGN PATENT DOCUMENTS

WO        99/37467 A1    7/1999

OTHER PUBLICATIONS

International Search Report, dated Apr. 23, 2015, from corresponding PCT Application.

* cited by examiner

*Primary Examiner* — James Sells
(74) *Attorney, Agent, or Firm* — Young & Thompson

(57) ABSTRACT

Method for forming a sealing element from extruded thermoplastic rods includes the steps of machining one or more extruded thermoplastic rods, each having a first and a second end, in a desired shape; bending the one or more machined thermoplastic rods into a circular structure at ambient temperature while keeping the stress in the one or more thermoplastic rods below the yield point; joining the first and second end faces of the thermoplastic rods to form the sealing element. A method for replacing and repairing a sealing element of a swivel is also described.

13 Claims, 3 Drawing Sheets

(51) Int. Cl.
*B29C 65/00* (2006.01)
*B29C 53/36* (2006.01)
*B29D 99/00* (2010.01)
*B29C 65/02* (2006.01)
*B29B 13/10* (2006.01)
*B29C 65/14* (2006.01)
*E21B 17/05* (2006.01)
B29L 31/26 (2006.01)
B29L 31/00 (2006.01)
B29K 27/12 (2006.01)
B29K 71/00 (2006.01)
B29K 101/12 (2006.01)

(52) U.S. Cl.
CPC ...... *B29C 65/1412* (2013.01); *B29C 66/1142* (2013.01); *B29C 66/5223* (2013.01); *B29C 66/5241* (2013.01); *B29C 66/73921* (2013.01); *B29D 99/0085* (2013.01); *E21B 17/05* (2013.01); *B29C 66/71* (2013.01); *B29C 66/919* (2013.01); *B29C 66/929* (2013.01); *B29K 2027/12* (2013.01); *B29K 2071/00* (2013.01); *B29K 2101/12* (2013.01); *B29L 2031/26* (2013.01); *B29L 2031/265* (2013.01); *B29L 2031/709* (2013.01)

(58) Field of Classification Search
CPC ............ B29C 66/5223; B29C 66/5241; B29C 66/73921; B29B 13/10; B29D 99/0085; E21B 17/05
USPC ........................................................ 156/73.5
See application file for complete search history.

METHOD FOR FORMING A SEALING ELEMENT FROM EXTRUDED THERMOPLASTIC RODS

FIELD OF THE INVENTION

The present invention relates to a method for forming a sealing element from extruded thermoplastic rods. The invention also relates to a method for replacing and repairing a sealing element of a swivel.

BACKGROUND

In order to accommodate the rigors of applications within large-scale equipment, providing reliable and durable large-scale sealing solutions has become of key importance in various industries. For example, in the offshore industry, the drilling into ever-deeper water brings with it numerous technical challenges, related to both equipment and operations, in particular for high-performance sealing systems. The sealing systems should be able to accommodate the large dimensions of the offshore equipment, combined with pressure, force and/or temperatures of the deep water environment. For deep water applications, the sealing systems in the offshore industry should be able to withstand high pressures, for example pressures amounting up to 500 bar. The diameter of the seals may vary between for instance 20 cm and several m.

The sheer scale of the equipment often requires sealing systems that allow in-situ servicing, with only partial disassembly. Tailored sealing solutions are required to mitigate for such requirements.

A method of forming large diameter thermoplastic seals is for example described in US2010/0116422 A1. US2010/0116422 A1 discloses the steps of heating an extruded rod, bending the heated extruded rod, joining the ends of the extruded rod to form a semi-finished ring, and annealing the semi-finished ring. The semi-finished ring may be machined or further processed to form a seal ring, back-up ring, or other seal device. In an example, joining the ends of the extruded rod includes welding the ends of the extruded rod by melting the ends and pressing the ends together. In particular, heating the extruded rods includes heating the rods to a temperature greater than the glass transition temperature. For most thermoplastic materials, this temperature is larger than 120° C. and requires a dedicated healing system to be installed and adjusted to the size of the extruded rods. In addition, the semi-finished ring resulting from the heating, bending and joining the ends of the extruded rod, needs further machining in order to obtain a finished seal. This method may be considered to be rather complicated and it does not allow in-situ forming of a sealing element, which is considered desirable in many sealing systems used in the offshore industry.

SUMMARY OF THE INVENTION

It is an object of the present invention to provide an improved method for forming thermoplastic seals which reduces the disadvantages and limitations of the methods, known from the prior art.

Thereto, the method for forming a sealing element from extruded thermoplastic rods is characterized in that the one or more machined thermoplastic rods are bent into an annular structure at ambient temperature while keeping the stress in the one or more thermoplastic rods below the yield point and the first and second end faces of the bent thermoplastic rods are joined to form the closed annular sealing element.

The inventors have observed that the method according the invention is simple to set up and does not require the use of complex, heavy and/or expensive equipment. The method further allows the forming of sealing elements with the desired stable mechanical properties and a consequent homogeneous material pressure balance. The thermoplastic rods from which the sealing elements are formed may be obtained by extrusion in virtually any technically feasible length. The sealing element obtained may be joined from a single thermoplastic rod or a plurality of thermoplastic rods and any technically feasible diameter is possible, without having to substantially alter the basic set-up for applying the method according to the invention. As a result, the method according to the invention eliminates the tailor-made manufacturing of seals since a back-up stock of thermoplastic rods should be available and may be formed into sealing elements of any desired size at any time. Since the sealing elements may be formed in situ from machined thermoplastic rods, the transport is very much simplified, compared to the transport of bulky sealing elements, which are formed ex situ and require dedicated packaging and transport, which is a clear disadvantage, especially in the offshore industry. A back-up stock of thermoplastic stocks on site also considerably shortens time necessary to replace a sealing element and reduces the down time of the equipment wherein the sealing element is used.

The thermoplastic rods may be extruded using any extrusion process, found suitable by the skilled person. For the subsequent machining of the thermoplastic rods in the desired shape, many machining processes are known in the art. Some of the most common are: milling—used to remove large volumes of thermoplastic with relatively high accuracy and precision and turning—often used to manufacture round shapes. The skilled person will select the adequate process or processes to obtain the desired shape.

The machined thermoplastic rods are bent into an annular structure at ambient temperature while keeping the stress in the one or more thermoplastic rods below the yield point. The yield point of the thermoplastic rods is defined as the stress due to the bending of the rod at which the thermoplastic rod begins to deform plastically. Prior to the yield point the rod will deform elastically and will return to its original shape when the applied stress is removed. Once the yield point is passed, some fraction of the deformation will be permanent and non-reversible. The yield point is in other words the point in the stress-strain curve at which the curve levels off and plastic deformation begins to occur. With the term "ambient" temperature as used herein, it is meant temperatures of the rod substantially corresponding to the rods surrounding environment, these temperatures typically ranging from 10° C. to 40° C., more specifically from 15° C. to 25° C.

The thermoplastic material of the rods may for example include a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the thermoplastic material includes polyketone, such as polyether ether ketone (PEEK), polyether ketone, polyether ketone ketone, polyether ketone ether ketone ketone, a derivative thereof, or a combination thereof. An example thermoplastic fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. An exemplary liquid crystal polymer includes aromatic polyester polymers, such as those available under tradenames XYDAR® (Amoco), VECTRA® (Hoechst Celanese), SUMIKOSUPER™ or EKONOL™ (Sumitomo Chemical), DuPont HX™ or DuPont ZENITE™ (E.I. DuPont de Nemours), RODRUN™ (Unitika), GRANLAR™ (Grandmont), or any combination thereof. In an additional example, the thermoplastic polymer may be ultra-high molecular weight polyethylene.

The thermoplastic material of the rods may also include a filler, such as a solid lubricant, a ceramic or mineral filler, a polymer filler, a fiber filler, a metal particulate filler or salts or any combination thereof. An exemplary solid lubricant includes polytetrafluoroethylene, molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, liquid crystal polymers such as Ekonol® polyester, polybenzimidazole, polytetrafluoroethylene, any of the thermoplastic polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

The rods may be for example formed of an extruded composite material. For example, the composite material may be formed of a thermoplastic material matrix and a filler. In a particular example, the filler is a solid lubricant. In another example, the filler includes a fluoropolymer. In a further example, the filler includes a combination of solid lubricant and fluoropolymer. In an embodiment, the composite material includes a polyketone matrix, such as PEEK, and includes a solid lubricant filler. In another exemplary embodiment, the composite material includes a polyketone matrix, such as PEEK, and includes a carbon filler which may be selected from graphite, carbon black, carbon fiber or any combination thereof.

The first and second end faces of the bent thermoplastic rods are joined to form the closed annular sealing element using any technique known in the art such as welding or infrared heating. A method of welding rod-shaped structures made from a thermoplastic material is known from WO 99/37467 which is hereby incorporated by reference.

According to an embodiment of the present invention, the method is characterized in that the ambient temperature is at least 10° C.

Contrary to the known methods, in which the rods are bent while heated above the glass transition temperature, such as 100° C., in the method according to the invention the rods are not placed on a heated forming surface, but are bent into their curved shape while freely supported at ambient temperature.

According to an embodiment of the present invention, the method is characterized in that the diameter of the sealing element is at least 1 m and a cross-sectional width is at least 4 mm.

The cross-sectional shape of the sealing element can be any geometry and size as long as the radial dimension of the cross section allows to remain in the elastic regime during bending.

According to an embodiment of the present invention, the method is characterized in that the one or more extruded thermoplastic rods are machined by milling, for instance one-step or multi-step milling.

Interconnecting the pre-machined rods allows the welding of a finished end product sealing element for which no more extra machining is needed except grinding of the bonding burrs.

According to an embodiment of the present invention, the method is characterized in that the first and second end faces are joined by welding.

The first and second end faces may for instance be joined by infrared heating.

According to an embodiment of the present invention, the thermoplastic material comprises fluorine.

According to an embodiment of the present invention, the thermoplastic material comprises PEEK.

According to an embodiment of the present invention, the sealing element has a uniform cross-section.

This allows successive assembly of a large number of rods, for manufacturing components of any desired diameter. For the smaller diameter sealing elements, the minimum dimensions are determined by the elastic limit of the material used and the cross-sectional dimensions.

The sealing element may the sealing ring for a high-pressure swivel or a back-up ring for a high-pressure swivel.

The invention also relates to a method for replacing or repairing a sealing element of a swivel, having an inner and an outer annular wall, which define an annular chamber there between, at least one annular sealing element being located between the inner and outer walls in a swivel groove, which sealing element comprises an annular structure of a thermoplastic material, comprising the steps of displacing the inner or the outer annular wall in an axial direction with respect to its adjacent wall, removing the non-functional sealing element from the swivel groove by opening the annular structure of the sealing element, and replacing the non-functional sealing element by a functional sealing element, characterized in that the functional sealing element is formed according to the method of the invention described above.

According to an embodiment of the present invention, the method for replacing or repairing a sealing element of a swivel is characterized in that the machined thermoplastic rods are bent into the swivel groove, optionally cut to length and subsequently the first and second end faces of the bent thermoplastic rods are joined to form the closed annular sealing element.

Advantageous embodiments are further defined by the dependent claims.

BRIEF DESCRIPTION OF THE DRAWINGS

The present invention will be described in detail with reference to the accompanying drawings. The drawings described are only schematic and are non-limiting. In the drawings, the size of some of the elements may be exaggerated and not drawn on scale for illustrative purposes. In the drawings:

FIG. 1 shows an elongate rod 1 of a length L of between 20 cm and 20 m, made of a thermoplastic material such as for instance PEEK. The rod 1 has been extruded and machined to have a u-shaped cross section, shown in FIG. 2. The cross-sectional width W may range from 4 mm to 100 mm. The rod 1 has flat end faces 2,3 that are oriented substantially perpendicular to the longitudinal sides 4 of the rod.

As shown in FIG. 3, the rod 1 is formed into an annular sealing element by clamping ends 5, 6 in clamping members 7,8 of a positioning device 9. The positioning device 9 has two arms 12, 13 with telescoping parts 14, 15. When the rod 1 is in its horizontal straight position, the arms 12, 13 are pivoted around a central hinge 17 to substantially extend in diametrically opposed directions, as shown by the dotted lines. The clamping members 7,8 clampingly engage on the end parts 18,19 of rod 1, while the telescoping parts of the arms 12,13 are in their extended position. Then the arms 12,13 are then rotated around the central hinge 17 until the end faces 2,3 are pressed together. An annular heating element 20, for instance of the type that is described in WO 99/37467—which is incorporated herein by reference—is enclosed around the abutting end faces 2,3 which are heated in a uniform manner while the arms maintain a pressure on the end faces that is lower than 0.5 Nmm$^{-2}$ at temperatures of between 300° C. and 400° C. The minimum length of the rod 1 in its straight orientation, is determined by the material and the cross-sectional dimensions W.

The heating element 20 is of annular shape and be comprised of two parts that are hingeably connected or that can be detached to fit around the closed contour of the circular rod, and to surround the weld area for uniform heat application.

Figure 1:
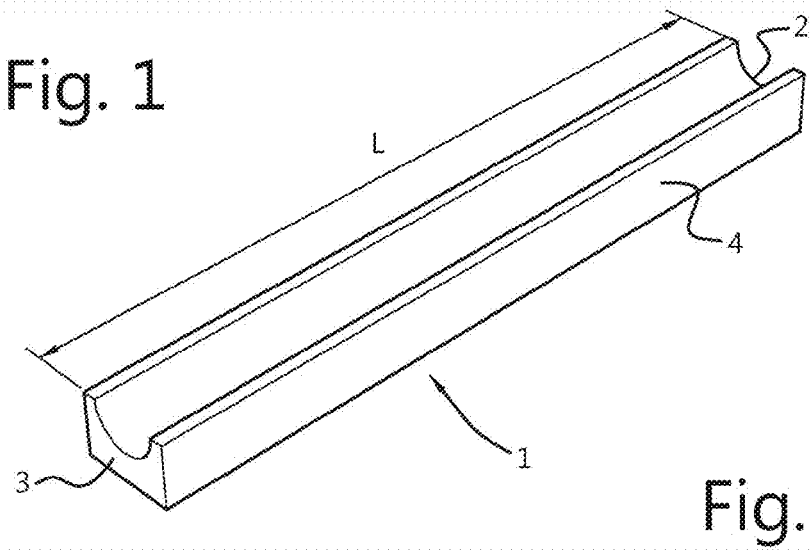
FIG. 1 shows a perspective view of a machined extruded thermoplastic rod with U-shaped cross-section.
Figure 2:
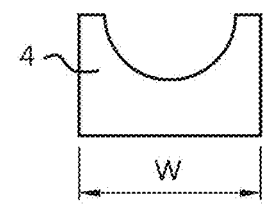
FIG. 2 shows a cross-sectional view of the rod of FIG. 1.
Figure 3:
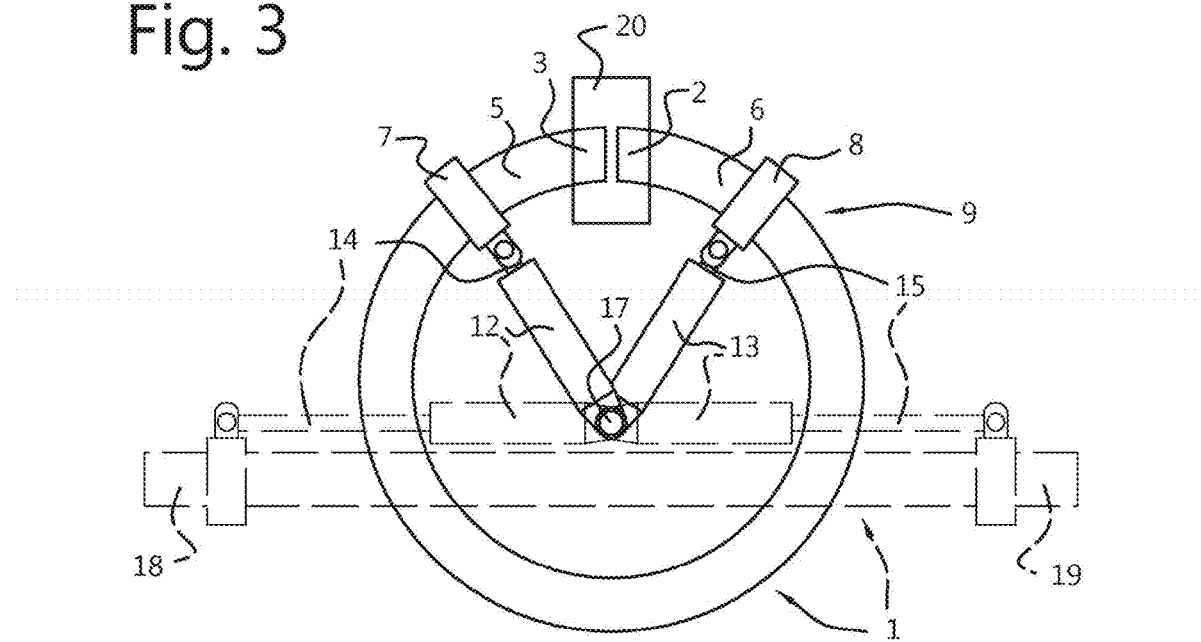
FIG. 3 shows the welding process of forming an annular sealing element by bending the rod of FIG. 1, and joining the end faces.
Figure 4:
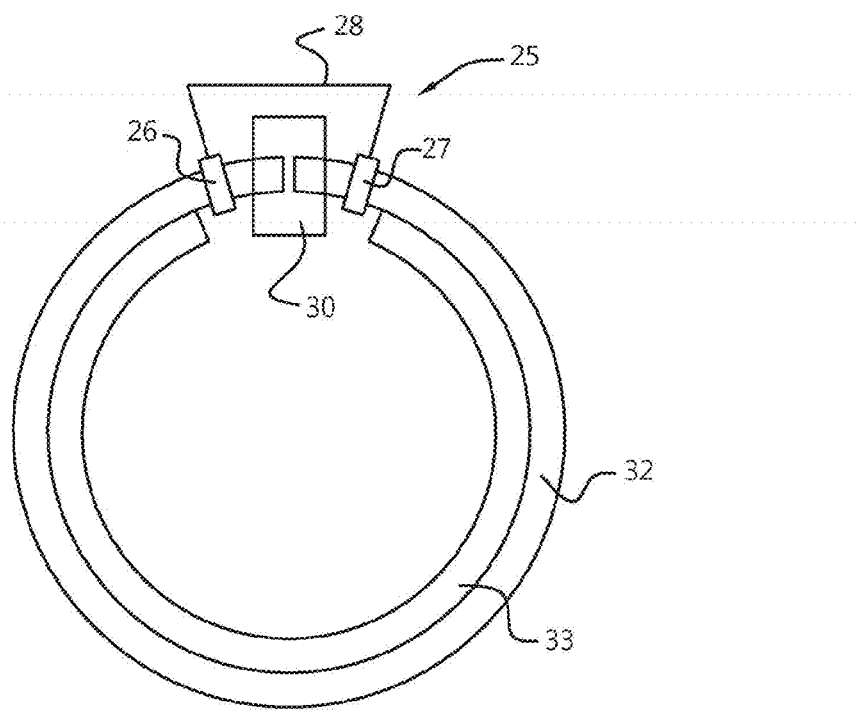
FIG. 4 shows a welding process by bending a rod of FIG. 1 around a cylindrical wall.

FIG. 4 shows an embodiment in which the rod 32 is bent against the outer surface of a cylindrical guide element 33, which may be formed by the central ring of a high pressure swivel on an offshore vessel. The welding device 25 comprises clamping members 26,27 that can be squeezed together via actuator 28 situated at the outer perimeter of the rod 32 when it is in its annular configuration.

Figure 5:
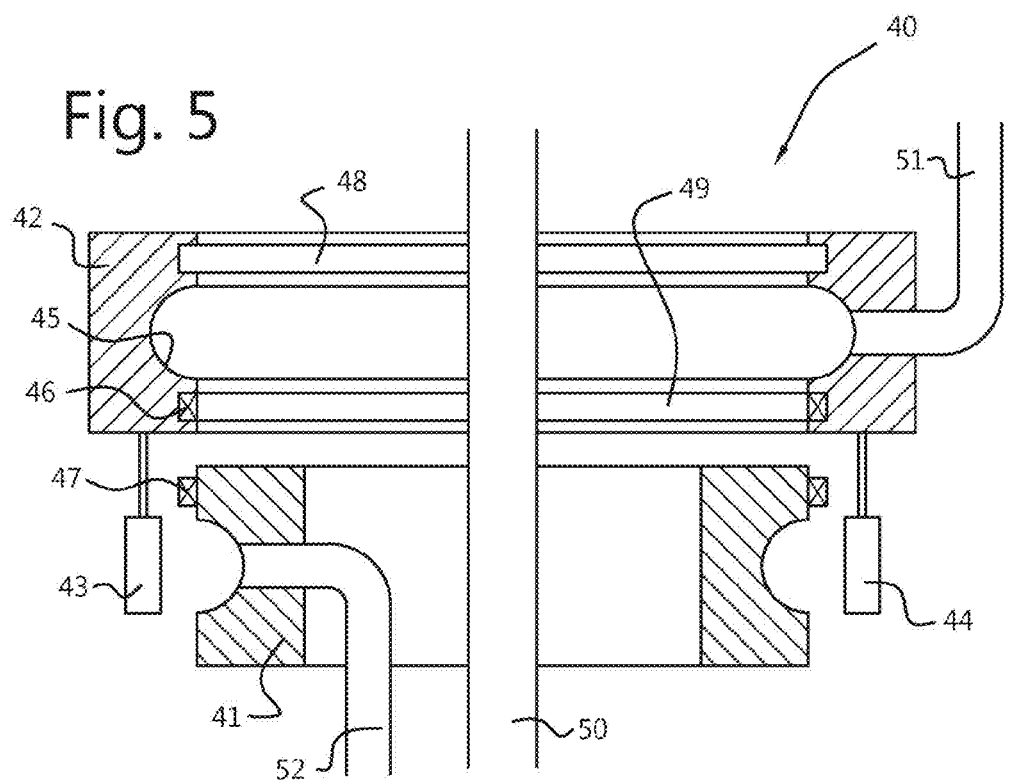
FIG. 5 shows a swivel with axially displaced inner and outer annular walls, and FIG. 6 schematically shows a method of forming an annular seal from a number of elongate rods.

FIG. 5 shows a high pressure swivel 40 with inner annular wall 41 and outer annular wall 42, that have been displaced in the axial direction by means of hydraulic cylinders 43,44. In the operative state of the swivel, the walls 41, 42 define a toroidal chamber 45 that is sealed by annular seals 46, 47 situated in grooves 48, 49. Hydrocarbons are supplied to the chamber 45 via risers extending from the subsea well to piping 50, 52 extending through the central part of the swivel 40 and connected to the inner walls 41 of the swivel. The swivel may be part of a stack of several pairs of annular walls. Via piping 51 that is connected to the outer wall 42, hydrocarbons are supplied to processing equipment on the vessel.

When for instance seal 47 becomes defective, the walls 41,42 are axially moved apart via cylinders 43,44. Then the seal 47 may be cut and removed from the swivel, past the piping 50 extending in the swivel's central space. A new straight thermoplastic rod may be bent around the inner wall 41 and the end faces may be joined by welding in the manner described above, where after the outer wall 42 is lowered and/or the inner wall 41 is raised, such that the chambers 45 are formed in a fluid-tight manner.

Figure 6:
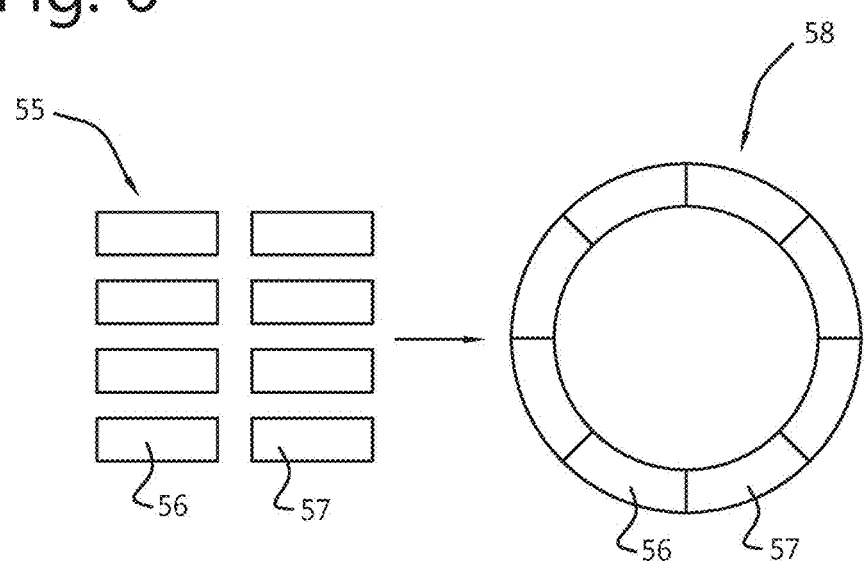

FIG. 6 schematically shows that a batch 55 of relatively short straight rods 56,57 may be interconnected to form annular seal 58 made up of several slightly curved rods. The sealing element 58 may be formed in situ off shore and the joints of the rods 56, 57 may be machined to remove excess material from the joint areas, just prior to swivel seal change out.

The invention claimed is:

1. Method for forming a sealing element (46,47,58) from extruded thermoplastic rods comprising the steps of:
   machining one or more extruded thermoplastic rods (1,56, 57), each having a first and a second end with a first and a second end faces (2,3), respectively, in a desired shape;
   wherein the method further comprises the steps of bending the one or more machined thermoplastic rods (1,56,57) into an annular structure at ambient temperature while keeping the stress in the one or more thermoplastic rods below the yield point and joining the first and second end faces (2,3) of the at least one bent thermoplastic rod (1) to form the closed annular sealing element (46,47,58).

2. Method according to claim 1, wherein the ambient temperature is at least 10° C.

3. Method according to claim 1, wherein the diameter of the sealing element (46,47,58) is at least 1 m and a cross-sectional width (W) is at least 4 mm.

4. Method according to claim 1, wherein the one or more extruded thermoplastic rods (1,56,57) are machined by one-step or multi-step milling.

5. Method according to claim 1, wherein the first and second end faces (2,3) are joined by welding.

6. Method according to claim 1, wherein the first and second end faces (2,3) are joined by infrared or heated furnace heating.

7. Method according to claim 1, wherein the thermoplastic material comprises fluorine.

8. Method according to claim 7, wherein the thermoplastic material comprises PEEK or related materials.

9. Method according to claim 1, wherein the sealing element (46,47,58) has a uniform cross-section.

10. Method according to claim 1, wherein the sealing element (46,47,58) forms the sealing ring for a high-pressure swivel (40).

11. Method according to claim 1, wherein the sealing element forms the back-up ring for a high-pressure swivel (40).

12. Method for replacing or repairing a sealing element (46,47) of a swivel (40), having an inner and an outer annular wall (41,42), which define an annular chamber there between, at least one annular sealing element (46,47) being located between the inner and outer walls in a swivel groove (48,49), which sealing element comprises an annular structure of a thermoplastic material, comprising the steps of:
- displacing the inner or the outer annular wall (41,42) in an axial direction with respect to its adjacent wall,
- removing the non-functional sealing element from the swivel groove (48,49) by opening the annular structure of the sealing element, and
- replacing the non-functional sealing element by a functional sealing element (46,47,58),
- wherein the functional sealing element is formed according to claim 1.

13. Method according to claim 12, wherein the machined thermoplastic rods are bent into the swivel groove (48,49), optionally cut to length and subsequently the first and second end faces (2,3) of the at least one bent thermoplastic rods are joined to form the closed annular sealing element.

\* \* \* \* \*